United States Patent
Noach et al.

(10) Patent No.: US 10,978,850 B2
(45) Date of Patent: Apr. 13, 2021

(54) PASSIVE Q-SWITCHING OF DIODE-PUMPED LASER

(71) Applicant: JERUSALEM COLLEGE OF TECHNOLOGY, Jerusalem (IL)

(72) Inventors: Salman Noach, Jerusalem (IL); Daniel Sebbag, Jerusalem (IL)

(73) Assignee: JERUSALEM COLLEGE OF TECHNOLOGY, Jerusalem (IL)

( * ) Notice: Subject to any disclaimer, the term of this patent is extended or adjusted under 35 U.S.C. 154(b) by 5 days.

(21) Appl. No.: 16/497,588

(22) PCT Filed: Apr. 2, 2018

(86) PCT No.: PCT/IL2018/050387
§ 371 (c)(1),
(2) Date: Sep. 25, 2019

(87) PCT Pub. No.: WO2018/185757
PCT Pub. Date: Oct. 11, 2018

(65) Prior Publication Data
US 2020/0036155 A1    Jan. 30, 2020

(30) Foreign Application Priority Data
Apr. 2, 2017 (IL) .......................................... 251520

(51) Int. Cl.
*H01S 3/113* (2006.01)
*H01S 3/11* (2006.01)
(Continued)

(52) U.S. Cl.
CPC ............ *H01S 3/1115* (2013.01); *H01S 3/082* (2013.01); *H01S 3/113* (2013.01); *H01S 3/1112* (2013.01);
(Continued)

(58) Field of Classification Search
CPC .... H01S 3/1112; H01S 3/1605; H01S 3/1608; H01S 3/161; H01S 3/0941; H01S 3/1115;
(Continued)

(56) References Cited

U.S. PATENT DOCUMENTS

| 8,130,800 B2 | 3/2012 | Holtom |
| 2003/0118060 A1 | 6/2003 | Spuehler et al. |

(Continued)

FOREIGN PATENT DOCUMENTS

EP    2849293 A1    3/2015

OTHER PUBLICATIONS

International Search Report for PCT/IL2018/050387, dated Jul. 26, 2018, 7 pages.

(Continued)

*Primary Examiner* — Kinam Park
(74) *Attorney, Agent, or Firm* — Pearl Cohen Zedek Latzer Baratz LLP

(57) ABSTRACT

A laser system, comprised of: a laser cavity; a gain medium a pump, a saturable absorber (SA); a first mirror and a second mirror; wherein a ratio of an area of the beam area within the SA to an area of the laser beam within the gain medium is greater than 1, and wherein the beam generates a gain medium radius spot on the gain medium and a saturable absorber radius spot on the saturable absorber such that a ratio between a saturable absorber radius spot on the saturable absorber and the gain medium radius spot on the gain medium is within a range of 1.7-7 is disclosed. A method for using the laser system e.g., for producing a pulsed energy is further disclosed.

17 Claims, 9 Drawing Sheets

(51) Int. Cl.
*H01S 3/16* (2006.01)
*H01S 3/30* (2006.01)
*H01S 3/082* (2006.01)
*H01S 3/0941* (2006.01)
*H01S 3/094* (2006.01)
*H01S 3/04* (2006.01)

(52) U.S. Cl.
CPC ............ *H01S 3/1118* (2013.01); *H01S 3/161* (2013.01); *H01S 3/1605* (2013.01); *H01S 3/1608* (2013.01); *H01S 3/30* (2013.01); H01S 3/0405 (2013.01); H01S 3/0941 (2013.01); H01S 3/09415 (2013.01); H01S 3/094053 (2013.01)

(58) Field of Classification Search
CPC .......... H01S 3/1118; H01S 3/082; H01S 3/30; H01S 3/0405; H01S 3/094053; H01S 3/113; H01S 3/09415
See application file for complete search history.

(56) References Cited

U.S. PATENT DOCUMENTS

| | | |
|---|---|---|
| 2004/0028090 A1 | 2/2004 | Pask et al. |
| 2014/0286364 A1* | 9/2014 | Pronin ................. H01S 3/0813 372/18 |
| 2015/0146702 A1* | 5/2015 | He ........................ H04W 48/20 370/338 |
| 2016/0344156 A1* | 11/2016 | Rothberg ................ H01S 3/105 |
| 2018/0347537 A1* | 12/2018 | Ikeoh ........................ H01S 3/00 |
| 2019/0249240 A1* | 8/2019 | Rothberg ............ H01S 3/10061 |

OTHER PUBLICATIONS

Written Opinion of the International Searching Authority for PCT/IL2018/050387, dated Jul. 26, 2018, 7 pages.

* cited by examiner

PASSIVE Q-SWITCHING OF DIODE-PUMPED LASER

CROSS REFERENCE TO RELATED APPLICATIONS

This application claims the benefit of priority from Israeli Patent Application No. 251520, filed on Apr. 2, 2017. The content of the above document is incorporated by reference in its entirety as if fully set forth herein.

FIELD OF THE INVENTION

The invention relates to the field of laser Q-switching.

BACKGROUND

Q-switching provides short duration optical pulses required for laser ranging, nonlinear studies, medicine, and other important applications. Passive Q-switching using a solid-state saturable absorber Q-switch is economical, simple and practical when compared to active Q-switching, which uses electro-optic or acousto-optic devices and electronic driving circuitry. The advantage of passive Q-switching inheres in its simplicity, reliability and economy compared to active methods.

Briefly, at low laser intensity, the saturable absorber ("SA") has a high absorption at the laser wavelength usually from approximately 20% to 50%. Absorption of laser light causes "bleaching" (reduced absorption) of the SA, which results in an increase in the intensity of the laser light. This process continues until the SA is fully bleached. Thus, the SA acts as a shutter and the laser emits a Q-switched pulse usually approximately 20-80 nanoseconds ("ns") (10-9 s) and is dependent upon the design of the laser resonator, e.g., the distance between the two mirrors.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a laser system, comprising a laser cavity; a gain medium disposed within the laser cavity; a pump configured to optically pumping the gain (lasing) medium; a saturable absorber; a first mirror disposed at a proximal first end of the laser cavity; and a second mirror disposed at a proximal second end of the laser cavity; wherein: the first mirror, the second mirror, and the saturable absorber are disposed along horizontal axis with the laser cavity, the saturable-absorber is disposed between the second mirror and the laser cavity, the system is configured to provide a laser beam along a horizontal axis, such that a ratio of an area of the beam area within the saturable-absorber to an area of the laser beam within the gain medium is greater than 1, the beam generates a gain medium radius spot on the gain medium and a saturable absorber radius spot on the saturable absorber, and a ratio between a saturable absorber radius spot on the saturable absorber and the gain medium radius spot on the gain medium is within a range of 1.7-7.

In some embodiments, the laser beam is characterized by a wavelength of Infrared (IR) spectrum.

In some embodiments, the laser beam is characterized by wavelength in the range from 1800 to 2650 nm.

In some embodiments, the laser beam is characterized by wavelength in the range from 1800 to 2100 nm.

In some embodiments, the ratio of the area of the beam area within the saturable-absorber to the area of the laser beam within the lazing medium is greater than 3.5.

In some embodiments, the SA comprises a material selected from the group consisting of: silver halides and chalcogenides, or a combination thereof.

In some embodiments, the lasing medium comprises a material substantially doped with a rare earth element.

In some embodiments, the gain medium comprises a crystal selected from the group consisting of: Yttrium Aluminum Garnet (YAG), Yttrium Aluminum Phosphorus (YAP), and Yttrium Lithium Fluoride (YLF).

In some embodiments, the rare earth element is selected from the group consisting of: Thulium (Tm), Holmium (Ho), Erbium (Er), or any combination thereof.

There is provided, in accordance with an embodiment, a passive Q-switch diode-pumped laser system, comprising a gain medium; and a saturable absorber, wherein the gain medium and the saturable absorber are disposed along a horizontal axis, wherein the system is configured to provide a laser beam along the horizontal axis, such that a ratio of the area of the beam area within the saturable-absorber to an area of the laser beam within the gain medium is greater than 1, wherein the beam generates a gain medium radius spot on the gain medium and a saturable absorber radius spot on the saturable absorber, and wherein a ratio between a saturable absorber radius spot on the saturable absorber and the gain medium radius spot on the gain medium is within a range of 1.7-7. In addition to the exemplary aspects and embodiments described above, further aspects and embodiments will become apparent by reference to the figures and by study of the following detailed description.

There is provided, in accordance with an embodiment, a method for producing a pulsed laser beam, the method comprising: (i) providing a system comprising: a laser cavity; a gain medium disposed within the laser cavity; a pump source; a saturable absorber (SA); a first mirror disposed at a proximal first end of the laser cavity; and a second mirror disposed at a proximal second end of the laser cavity; (ii) supplying electrical power to the pump source so as to energize the gain medium, thereby: producing a laser beam crossing through the gain medium and the SA; generating a gain medium radius spot on the gain medium; generating an SA radius spot on the SA; transmitting the laser beam through the second mirror, thereby outputting a pulsed laser beam; wherein: (a) a ratio of an area of the laser beam within the SA to an area of the laser beam within the gain medium is greater than 1, and (b) a ratio of the SA radius spot to the gain medium radius spot is within a range of 1.7-7.

In some embodiments, the ratio of an area of the laser beam within the gain medium to the area of the laser beam within the SA is greater than 3.5.

In some embodiments, the pulsed laser beam is characterized by energy of at least 1 mJ. In some embodiments, the pulsed laser beam energy is in the range of 1 to 10 mJ.

In some embodiments, the electrical power is supplied at 1 to 50 Watts.

In some embodiments, the method comprises a step (iii) of focusing the output laser beam into a Raman gain crystal.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods, systems, and/or materials are described below. In case of conflict, the patent specification, including definitions, will control. In addition, the materials, methods, and examples are illustrative only and are not intended to be necessarily limiting.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Disclosed herein is a pumped diode Q-switched laser, according to certain exemplary embodiments.

Before explaining at least one embodiment of the invention in detail, it is to be understood that the invention is not necessarily limited in its application to the details set forth in the following description or exemplified by the Examples. The invention is capable of other embodiments or of being practiced or carried out in various ways.

Disclosed herein is a laser system, e.g. a laser operating in the 2 micrometers ("μm") region. Optionally, the laser is a pulsed laser, which may be used for a variety of applications, e.g. surgery, military applications, material processing, optical communication, LIDAR or the like. The pump laser may work as a source for non-linear crystals, or in some cases for Chromium doped Zinc Selenide ("Cr:ZnSe") lasers and optical parametric oscillators.

In some cases, a Thulium™ ion, absorbing on the $^3F4 \rightarrow ^3H6$ transition, provides an absorption band around 800 nm, which matches the emission of Aluminum Gallium Arsenide ("AlGaAs") laser diodes designed for $Nd^{3+}$-ion pumping. In some cases, a passive Q-switching of such diode-pumped solid state lasers by saturable absorbers is a widespread technique to produce short pulse laser beams.

In some cases, the Cr:ZnSe and the Chromium doped Zinc Sulfide ("Cr:ZnS") saturable absorbers may have a relatively high absorption cross-sections, thus not requiring a focusing mode to a small area on the SA. This may provide more flexibility with respect of the resonator. Optionally, the Cr:ZnSe and the Cr:ZnS saturable absorbers is a low saturable intensity, which may lead to reduced risk of damage during Q-switched operation.

In some exemplary embodiments of the subject matter, the Cr:ZnS crystal saturable absorber may be applied in several passive Q-switch ("PQS") lasers, e.g. Ho:YAG, Tm:KY(WO$_4$), Tm:KLu(WO$_4$), or the like. In some cases, the SA may fulfill a passive Q-switch when $\sigma_{SA}/A_{SA} > \sigma_g/A_g$, where $\sigma_{SA}$ and $\sigma_g$ represent the absorption cross section of the saturable absorber and the emissions cross section of a gain medium at the lasing wavelength, respectively, and $A_{SA}$ and $A_g$ may be the mode area at the saturable absorber and gain medium.

In certain embodiments, a Cr:ZnSe crystal provides a higher absorption cross-section than a Cr:ZnS crystal, e.g. $8.7 \times 10^{19}$ square centimeters ("cm$^2$") for the Cr:ZnSe and $5.2 \times 10^{19}$ cm$^2$ for the CR:ZnS crystal. Thus, one skilled in the art would understand that the Cr:ZnSe crystal may be preferable for a passive Q-switch due to the lower intracavity fluencies.

Figure 1:
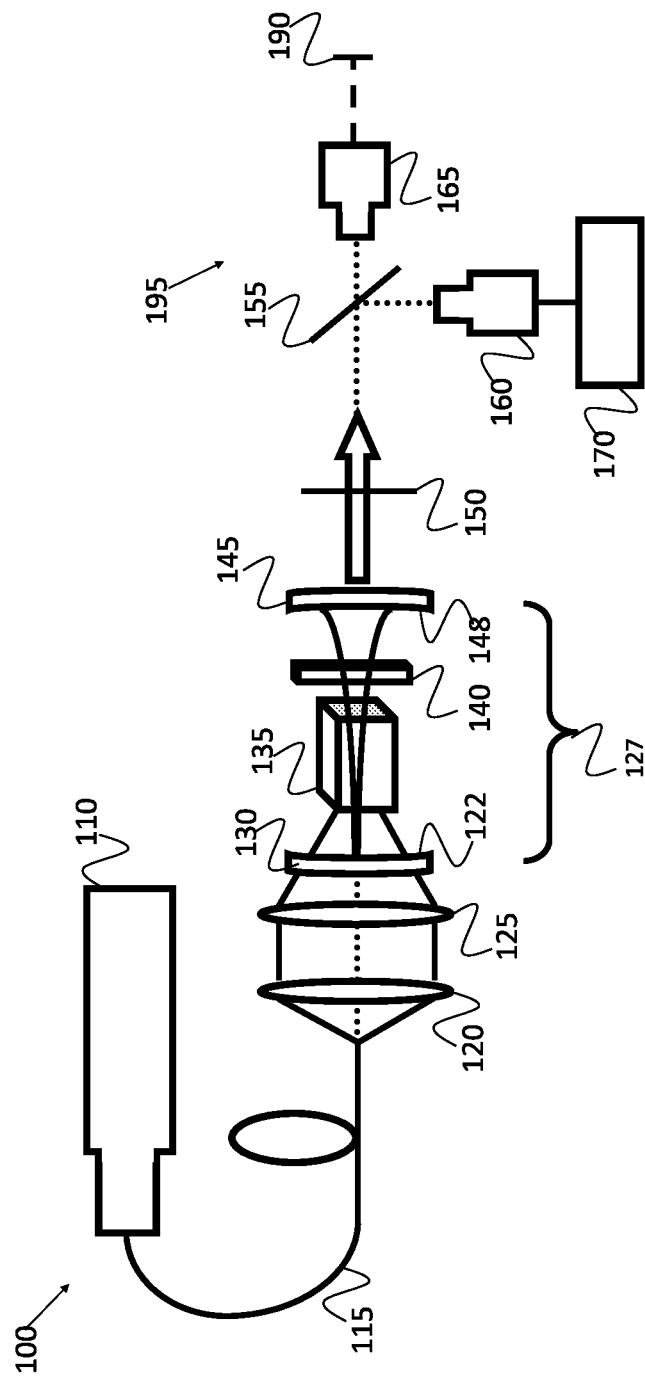
FIG. 1 is a schematic illustration of an exemplary laser system, according to certain exemplary embodiments of the subject matter.

Reference is now made to FIG. 1 showing a schematic illustration of an exemplary laser system, according to some exemplary embodiments of the subject matter. According to one aspect of the present invention, there is provided a laser system 100. Laser system 100 may comprise a pump diode 110. The pump diode 110 may be optically coupled into a fiber 115 to generate a gain for a laser. Pump diode 110 may be operated in a continuous wave mode or quasi-continuous wave mode.

Pump diode 110 may be tuned to provide a beam having a wavelength which matches the corresponding absorption lines of a gain medium as described below. There are various pump schemes and pumping configurations well known in the art and some of them may be applied to the present disclosure application. Pump diode 110 may include direct pumping, the pump diode may deliver into fiber 115. Optionally, the pump diode 110 configurations may include a side pump and an end pump.

Laser system 100 may comprise a gain medium 135. The gain medium 135 may be disposed within a laser cavity 127. Non-limiting exemplary gain media 135 are selected from materials (also referred to as "laser crystal") doped with a rare-earth element. In some embodiments, the material is a crystal selected from: Yttrium Aluminum Garnet ("YAG"), and Yttrium Lithium Fluoride ("YLF"), and Yttrium Aluminum Phosphorus ("YAP"). In some embodiments, the rare earth element is selected from Thulium (Tm), Holmium (Ho), Erbium (Er), or any combination thereof.

Further non-limiting exemplary gain media 135 are selected from: Tm:YAG, Tm:YVO$_4$, Tm:YLF, Tm:YAP or Tm:LuAG. In some embodiments, the concentration of the Tm$^{3+}$ dopant in the host crystal material of the laser crystal is inversely proportional to the length of the laser crystal. In some embodiments, the concentration of Tm$^{3+}$ dopant is between about 0.2% and about 8%, by weight.

The laser system 100 may comprise a first optical element 130 and a second optical element 145. Optionally, the laser system 100 may comprise a first collimation lens 120 and a second focusing lens 125. The first optical element 130 may be selected from a lens, a reflector, a mirror, e.g. a convex mirror, and a prism. Optionally, the radius of curvature of the convex mirror is in the range of 100 to 400 mm. The first optical element 130 may be positioned in a light-path e.g. approximately along the longitudinal axis 190 of the laser system 100. The laser system 100 may comprise a saturable absorber 140 e.g., saturable absorbing passive Q-switches. The saturable absorber 140 may be in the form of a thin layer or film. Optionally, non-limiting exemplary saturable absorber 140 may comprise a material selected from doped ZnS crystals, and doped ZnSe crystals e.g., chromium doped ZnSe crystals, chromium doped ZnS crystals, or a combination thereof. Further non-limiting exemplary saturable absorber 140 may comprise a material selected from doped silver halide or a chalcogenide. The laser system 100 may comprise a gain (lasing) medium 135, and saturable absorber 140, which are disposed along a longitudinal axis 190. In some embodiments, horizontal axis 190 may be defined as up to ±30 degrees in from the longitudinal axis 190.

The first optical element 130 may be located at a proximal first end of laser cavity 127. First optical element 130 may include a first surface 120 and a second surface 125. The first surface 122 may be directed substantially towards the laser cavity 127 and gain medium 135. The first optical element 130 may be a high reflecting mirror, as is well known in the art. First surface 122 may be coated with silver, a dielectric, or some similar coating to provide the high reflective properties. First surface 122 may be characterized as High Transmission ("HT") of the beam received from pump diode 110. First surface 122 may be characterized as having High Reflection ("HR") of the wavelength in the infra-red (IR) range, e.g., 1800-2000 nm.

First optical element 130 may be configured to be a diverging optical element; either as a reflecting convex surface, as a plano element, or as a plano-concave optical element. The light striking first optical element 130 may diverge as it reflects back toward gain medium 135. In some cavities, dependent upon gain medium 135, it may be beneficial to place an aperture 130 adjacent to first optical element 130 so as to prevent high divergent light from reentering gain (lasing) medium 135, e.g., due to waveguiding effects. In some cases, the first optical element 130 may be a lens or birefringent plate, which may enable tunability of the gain medium 135.

The first optical element 130 may be collimated by first surface 122 and made available to again seed gain medium 135 for further amplification while retaining the low order mode quality originally established.

Laser system 100 may have a second optical element 145, also referred to as output mirror. Second optical element 145 may be positioned at a proximal second end of laser cavity 127. Second optical element 145 may be selected from a lens, a reflector, a mirror and a prism. Second optical element 145 may be positioned in a light-path of the beam e.g. approximately along the longitudinal axis of laser system 100.

Second optical element 145, also known as the output mirror, may be positioned at second end of laser cavity 127, opposite to first optical element 130. Second optical element 145 may act as a regenerative and/or as transmissive interface for laser beam exiting laser cavity 127. Optionally, the length of the laser cavity 127 may be within a range of 208-410 mm. Second optical element 145 may have a second surface 148. Second surface 148 may be coated for partial reflectivity, dependent upon the gain of gain medium 135. Second surface 148 may be antireflection coated for the light being amplified.

In certain embodiments, laser system 100 may be monitored via a monitoring system 195. Monitoring system 195 may provide a manner for monitoring and obtaining experimental data from the laser system 100 according to its output. The monitoring system 195 may comprise an optical filter 150. Optical filter 150 may be optically connected to laser cavity 127 at least partially by free space light propagation. The wavelength of a beam emitting through the optical filter 150 may be tuned, for example, by altering the angle of the optical filter 150 with respect to the incident optical beam output from the laser. Optical filter 150 may comprise one or more arrayed waveguide gratings. Monitoring system 195 may comprise a beam splitter 155. Beam splitter 155 may have a predetermined power ratio between reflected and transferred components of a laser beam that incident with the original laser beam. Beam splitter 155 may be insensitive to the direction of the polarization of the incident laser beam and its reflected and transferred components. Beam splitter 155 may be insensitive to the polarization, thus there may be no requirements for the incident beam's polarization. The angle of the beam splitter 155 in relation to the incident beam may be, for example, in a 45-degree angle. Exemplary range of angles for Beam splitter 155 may be: 20-60 degree. For measurement purposes, a distance "D" between Beam splitter 155 and the convex mirror 120 may be quite small in relation to the radius of the convex mirror 120. Optionally, the distance 'D' may be in the range of 5 to 5000 microns.

Monitoring system 195 may comprise an oscilloscope 170. Oscilloscope 170 may allow displaying the intensities of the beams emitting optical filter 130. Oscilloscope 170 may be operatively connected to a photodiode 160. Photodiode 160 may allow converting a component of a laser beam to an electric signal. The monitoring system 195 may have a power (or energy) meter 165. Power meter 165 may allow measuring the power level of a laser source beam. Power meter 165 may have a sensor and/or a photodetector and a variable electrically connected.

In some exemplary embodiments of the subject matter, the laser diode 110 provides a beam of, e.g., a 105 μm core diameter and a NA of 0.22, thus emitting within a range of 12-W at approximately a wavelength of 793 nm. The beam may collimate and focus into an initial pump spot of 200 μm on the gain medium 135 via the first optical element 130. Optionally, the gain medium 135 has a length of 8 mm and a cross-section of 3×3 mm. The Tm-doped concentration may be at approximately 4%. Optionally, the gain medium 135 may be wrapped in Indium foil and placed in a copper holder (not shown), where the copper holder is inserted into a circulating water cooled aluminum housing and maintained at approximately 18° C. for heat dissipation or thermo electric cooling.

The saturable absorber 140 may be positioned to provide a maximized energy pulse without damaging the saturable absorber 140 surface, e.g. approximately at 8 cm from an output of the pump diode 110 or fiber 115. Optionally, the saturable absorber 140 may be 2 mm thick with apertures of 4×4 mm, also placed in a copper holder.

Laser system 100 may have a housing. The housing may be made of a rigid, durable material, such as, without limitation, aluminum, stainless steel, a hard polymer and/or the like. The housing may have a cylindrical, conical, rectangular or any other suitable shape. The housing may prevent unwanted foreign elements from entering thereto.

In some exemplary embodiments of the subject matter, the distance between the first optical element 130 to the gain medium 135 may be within a range of 10-20 mm. The distance between the gain medium 135 and the saturable absorber 140 may be within a range of 85-160 mm. The distance between the saturable absorber 140 and the second optical element 145 may be within a range of 80-105 mm.

In some exemplary embodiments of the subject matter, the gain medium 135 may comprise a spot radius within a range of 128-150 µm, and the saturable absorber 140 may comprise a spot radius within a range of 410-785 µm. In some cases, the ratio between a saturable absorber spot radius and a gain medium spot radius may be within a range of 0.1-7, 1-7, 1.7-7, e.g., 2.5 to 6 or 3 to 5.

One specific exemplary embodiment of the subject matter, the distance between the first optical element 130 to the gain medium 135 may be 10 mm. The distance between the gain medium 135 and the saturable absorber 140 may be 85 mm. The distance between the saturable absorber 140 and the second optical element 145 may be 105 mm. The gain medium 135 may comprise a spot radius within a range of 30 µm, and the saturable absorber 140 may comprise a spot radius within a range of 450 µm. The total length of the laser cavity 127 may be 215 mm. The ratio between a saturable absorber spot radius and a gain medium spot radius may be, for example, 3.46.

Figure 2:
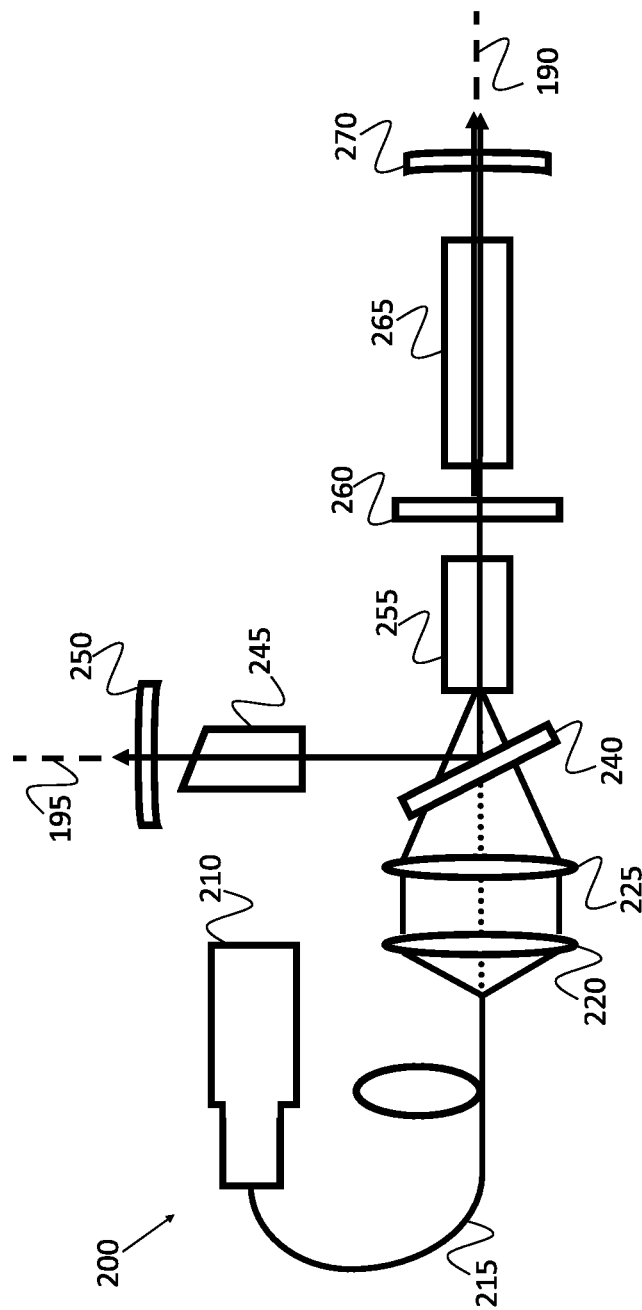
FIG. 2 shows a Raman laser system comprising a folded internal cavity, according to certain exemplary embodiments of the subject matter.

Reference is made to FIG. 2 showing a laser system comprising a folded internal cavity, according to certain exemplary embodiments of the subject matter. Optionally, the laser system 200 is an internal Raman laser system, which produces a laser output in a range of 2.0-2.7 µm, e.g. 2.35 µm or 2.65 µm. Optionally, the laser system 200 may be a diode-pumped active Q-switched comprising a gain medium, e.g. Tm:YAP, Tm:TLF, Tm:TAG. The laser system 200 may comprise a Raman crystal, e.g. Barium Tungstate ("BaWO$_4$"), Barium Nitrate ("Ba(NO$_3$)$_2$"), Calcium Carbonate ("CaCO$_3$"), and KGW. Optionally, the laser system 200 may comprise a first focusing lens 220 and a second focusing lens 225. The laser system 200 may comprise a pump diode 210. The pump diode 210 may be optically coupled into a fiber 215 to generate a gain for a laser.

The laser system 200 may comprise a folding mirror 240. The laser system 200 may comprise the gain medium 255. The laser system 200 may comprise a Q-switch 245. The laser system 200 may comprise first mirror 250, a second mirror 260, and a third mirror 270, e.g. with suitable coating as disclosed herein. The laser system 200 may comprise a monitoring system 265, which may be configured similarly as disclosed hereinabove in FIG. 1.

In some exemplary embodiments, the laser system 200 may provide an incident diode power of up to 50 Watts (W), e.g. at 793 nm, and may provide a pulse repetition of 100 Hz (Hertz) to 5 kHz (Kilo Hertz) in the resonator of the 2 µm laser. In some cases, an average output powers after 270 at the first stokes laser 2.35 µm is estimated at a Watt level. Optionally, the pulse width is less than 10 ns.

Figure 3:
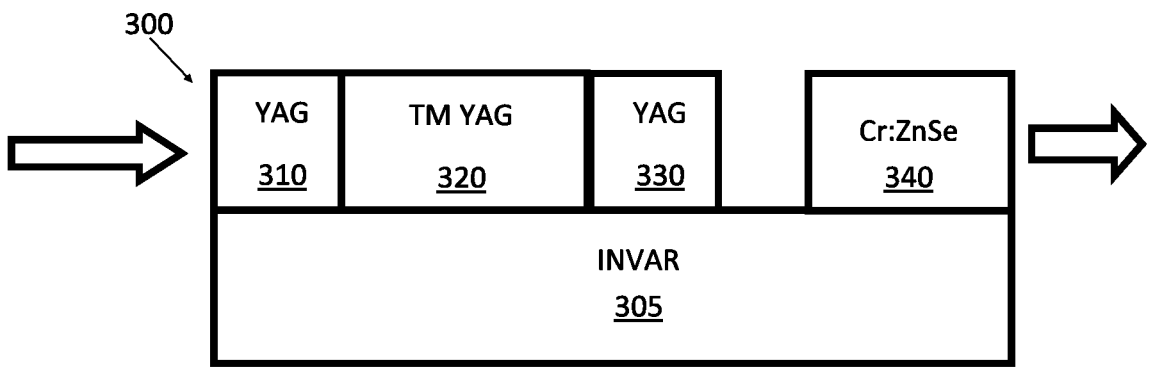
FIG. 3 shows a monolithic compact design laser, according to certain exemplary embodiments of the subject matter.

FIG. 3 shows a hybrid 2 µm laser resonator, according to certain exemplary embodiments of the invention. The hybrid 2 µm laser resonator 300 may provide that laser resonator components are in a monolithic or hybrid design, e.g. connected, for example, via a diffusion bond or the like. The exemplary embodiment may enable miniaturizing the laser 300, for example, to a handheld size. Optionally, the laser 300 may function as a resonator and may be pumped as disclosed in laser system 200 above, or may be a diode pump bar. The laser 300 may comprise an invar substrate 305 as a base for the laser components. The laser 300 may comprise arranged on top of the invar substrate 305 a gain medium 320, e.g. Tm:YAP, Tm:YLF, or Tm:YAG, as a first facet of the gain medium 320. Optionally, the gain medium 320 may comprise a mirror coating, e.g. a first facet 310 and a second facet 330. Optionally, the first facet 310 and the second facet 330 are end caps that are defused to the gain medium 320. In some exemplary embodiments, the gain medium 320 and the first facet 310 and the second facet 330 may have a length within a range of 2-20 mm, e.g. 10 mm. The laser 300 may comprise a saturable absorber (SA) 340, for example a Cr:ZnSe/S crystal. Optionally, the SA 340 is a film, with a length within a range of 1-10 mm, e.g. 6 mm. Optionally, SA output facet is coated and serves as an output mirror with HT connectivity to output the 2 µm pulses.

Figure 4:
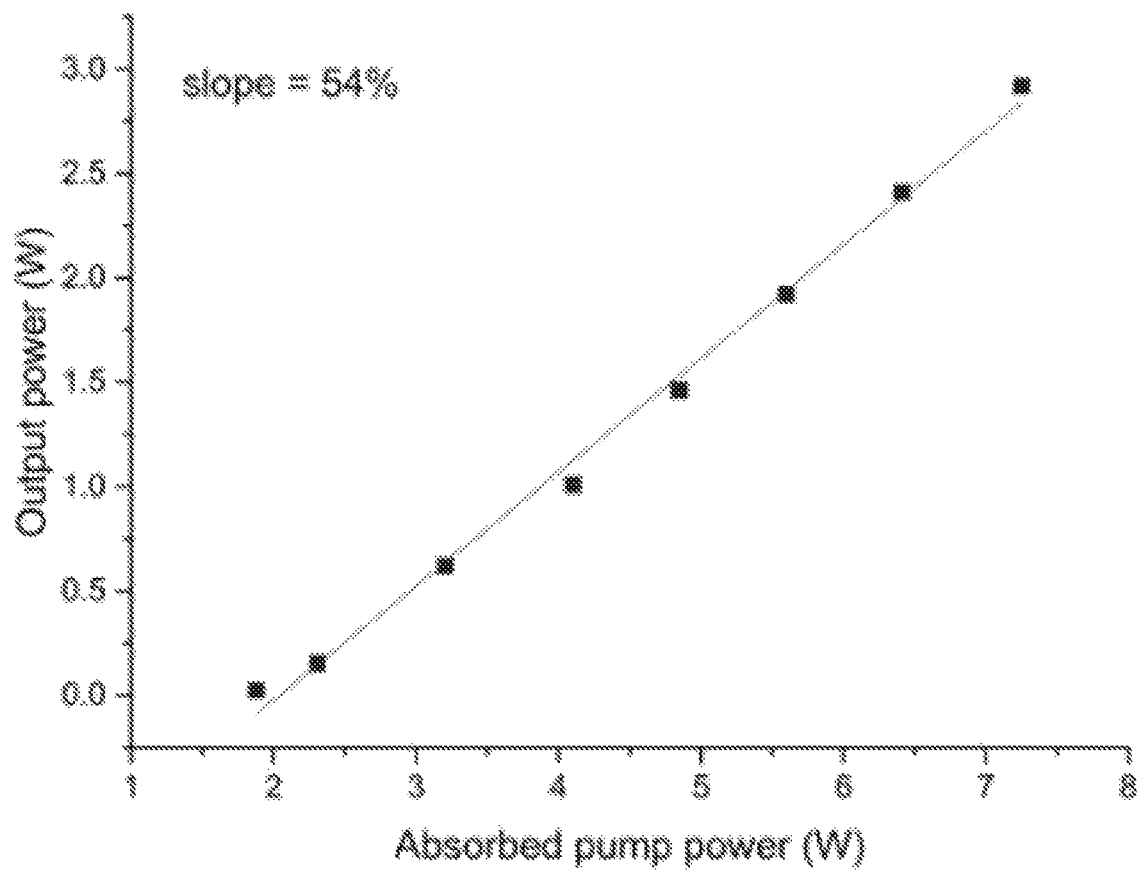
FIG. 4 shows an output power graph for a continuous wave operation laser system, according to certain exemplary embodiments of the subject matter.

Reference is made to FIG. 4 showing an output power graph for a continuous wave operation of the laser system, e.g. laser system 100, according to certain exemplary embodiments of the subject matter. The laser system 100 without an saturable absorber 140, the output power of the Tm:YLF laser as a function of incident pump power with a 90% reflectance output coupler. For example, the pump power threshold may be 2.97 W, and a maximum output power of 2.92 W may be achieved at ~7 W absorbed pump power. The slope efficiency may be 30.1% when a measured wavelength is at a 1908 nm. In some cases, the laser radiation may be σ polarized, e.g. perpendicular to the longitudinal axis 190.

Figure 6:
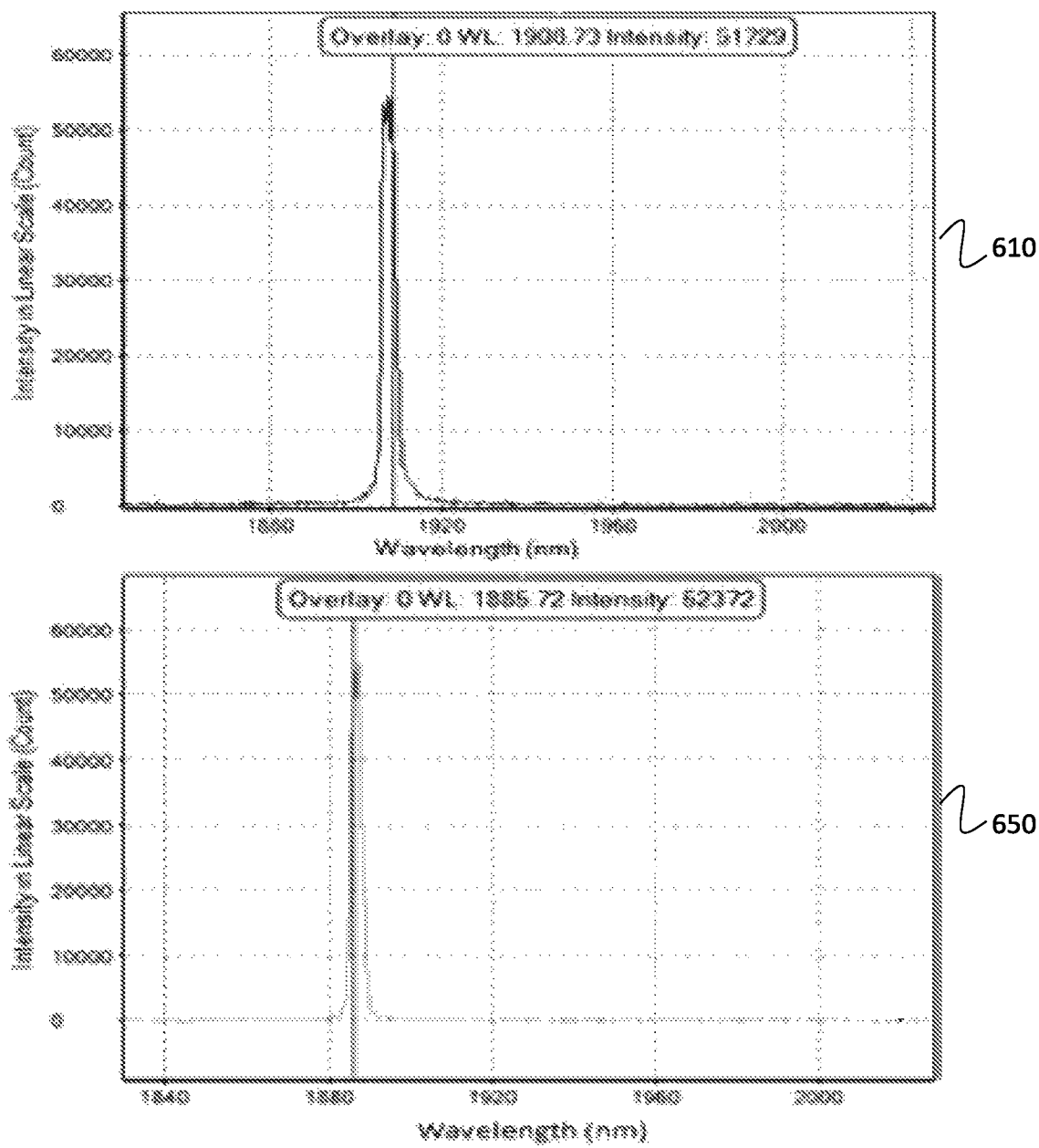
FIG. 6 shows a laser emission spectrum for a continuous wave operation and a passive Q-switch operation, according to some exemplary embodiments of the subject matter.

Reference is made to FIG. 6 showing a laser emission spectrum for a continuous wave operation and a passive Q-switch operation, according to some exemplary embodiments of the subject matter: the top graph 610 showing the slope efficiency of the continuous wave operation to be 30.1% at a wavelength of 1908 nm. The laser radiation may be polarized perpendicular to the gain medium axis, e.g. the longitudinal axis 190.

Figure 5:
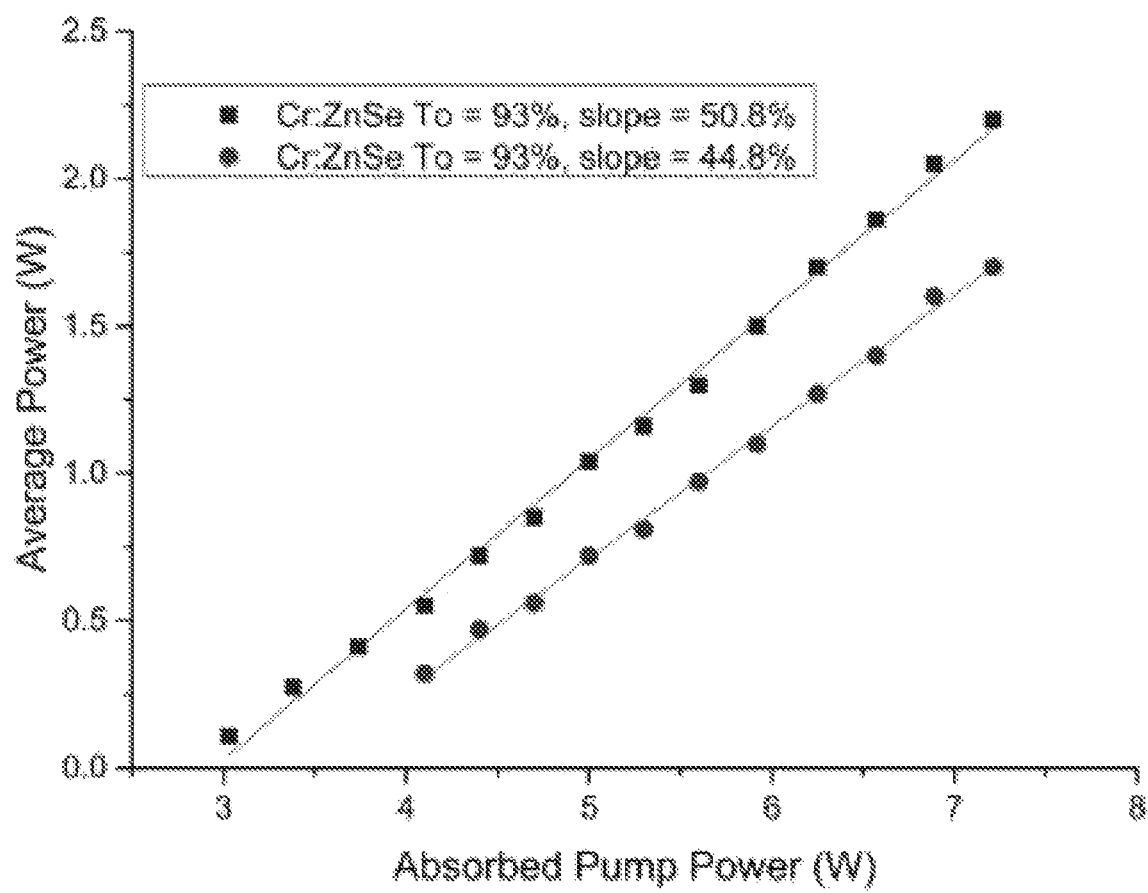
FIG. 5 shows a laser average power graph for a Q-switching diode pumped laser system, according to certain exemplary embodiments of the subject matter.
Figure 7:
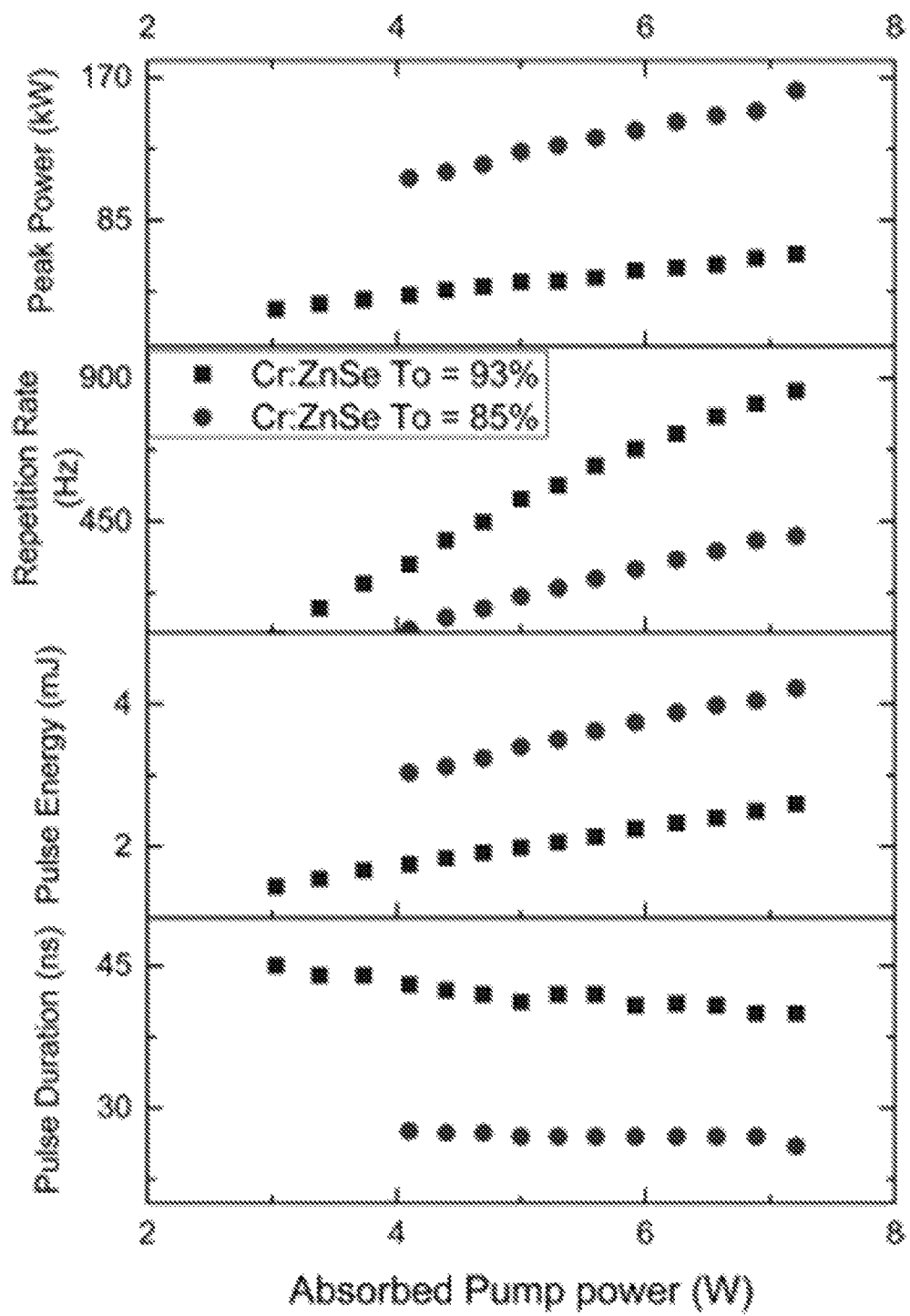
FIG. 7 shows a pulse parameter for passive Q switched Tm:YLF laser, according to certain exemplary embodiments of the subject matter.

Reference is made to FIG. 7 presenting pulse parameters for passive Q-switched Tm:YLF diode pumped laser, e.g. laser system 100, according to certain exemplary embodiments of the subject matter. Optionally, where the Cr:ZnSe saturated absorber 140 of a $T_0$=93% and 70% reflectance output coupler, the highest average output power of 2.2 W may be achieved via optical conversion and a slope efficiency may be 30.5% and 50.8%, respectively. The repetition rate increases in an almost linear with the pump power reaching 860 Hz at single pulse energy, e.g. 2.6 mJ. As disclosed by FIG. 5, the minimum full width at half maximum pulse duration occurs at 40 ns, providing a peak power of approximately 65 kW.

In some exemplary embodiments, where the Cr:ZnSe saturated absorber 140 of a $T_0$=85% and 70% reflectance output coupler, the maximum average output power may be 1.7 W. Optionally, the optical conversion and slope efficiencies may be 23.6% and 44.8% respectively. At a maximum absorbed pump power, the repetition rate may be 400 Hz, and a single pulse energy may be of 4.22 mJ, together with a full width at half maximum pulse width at 26 ns, corresponding to a peak power of ~160 kW.

Referring back to FIG. 6, the bottom graph 650 shows a passive Q-switch regime. The emission wavelength of the passive Q-switch regime may be at approximately 1885 nm, e.g. blue shifted to a shorter wavelength as compared to the top graph 610.

Figure 8:
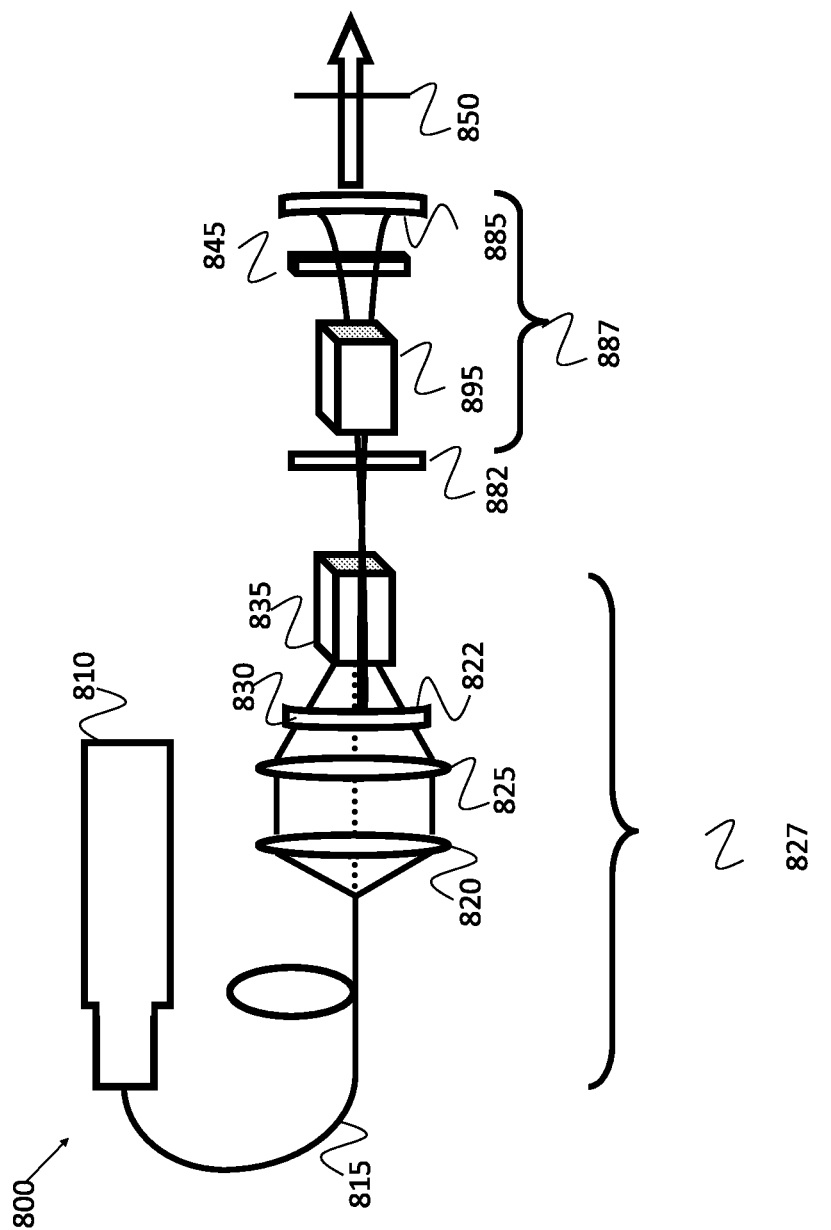
FIG. 8 shows a linear internal cavity configuration laser, according to some exemplary embodiments of the subject matter; and, FIG. 9 shows a linear external cavity laser configuration, according to some exemplary embodiments of the subject matter.

FIG. 8 shows a linear internal cavity configuration laser, according to some exemplary embodiments of the subject matter. The laser system 800 may be a 793 nm pump system.

The laser system 800 may comprise a laser diode 810. Laser diode 810 may be optically coupled into a fiber 815 to generate a gain for a laser.

Laser system 800 may have lenses, e.g. a culminating lens 820, and a first lens 825, which may be configured similarly to the lenses of FIG. 1. The laser system 800 may comprise an input mirror having a HT coated surface for the 793 nm wavelength input and a HR coating output surface, e.g. the 2 μm output. The laser system 800 may comprise a gain medium 835, which may be configured similarly to the system of FIG. 1.

Exemplary gain medium 835 may be e.g., Tm:YLF, Tm:YAP or Tm:YAG crystal. Laser system 800 may comprise an internal mirror 882, which may have a 2 μm coating for HT on both sides of the internal mirror 882 and a 2.2-2.7 μm coating on the output side of the internal mirror.

The internal mirror 882 may act as an input for a Raman inner cavity 887, e.g. HR for 2 μm and a partial reflection ("PR") within a range of 2.2-2.7 μm.

Raman inner cavity 887 may be positioned in a light-path e.g., approximately along the longitudinal axis of laser system 800.

Raman inner cavity 887 may have a Raman gain crystal 895. Raman inner cavity 887 may have a saturable absorber 845 (e.g., passive Q-switch CrZn:S or CrZn:Se). Laser system 800 may have an output coupler 885. Output coupler 885 may be in operable communication with at least one of the 2 cavities: laser cavity 827 and Raman inner cavity 887. Laser system 800 may have an optical filter 850. Optical filter 850 may be optically connected to Raman inner cavity 887. Further non-limiting exemplary configurations of optical filter 850 are described in the system of FIG. 1.

Figure 9:
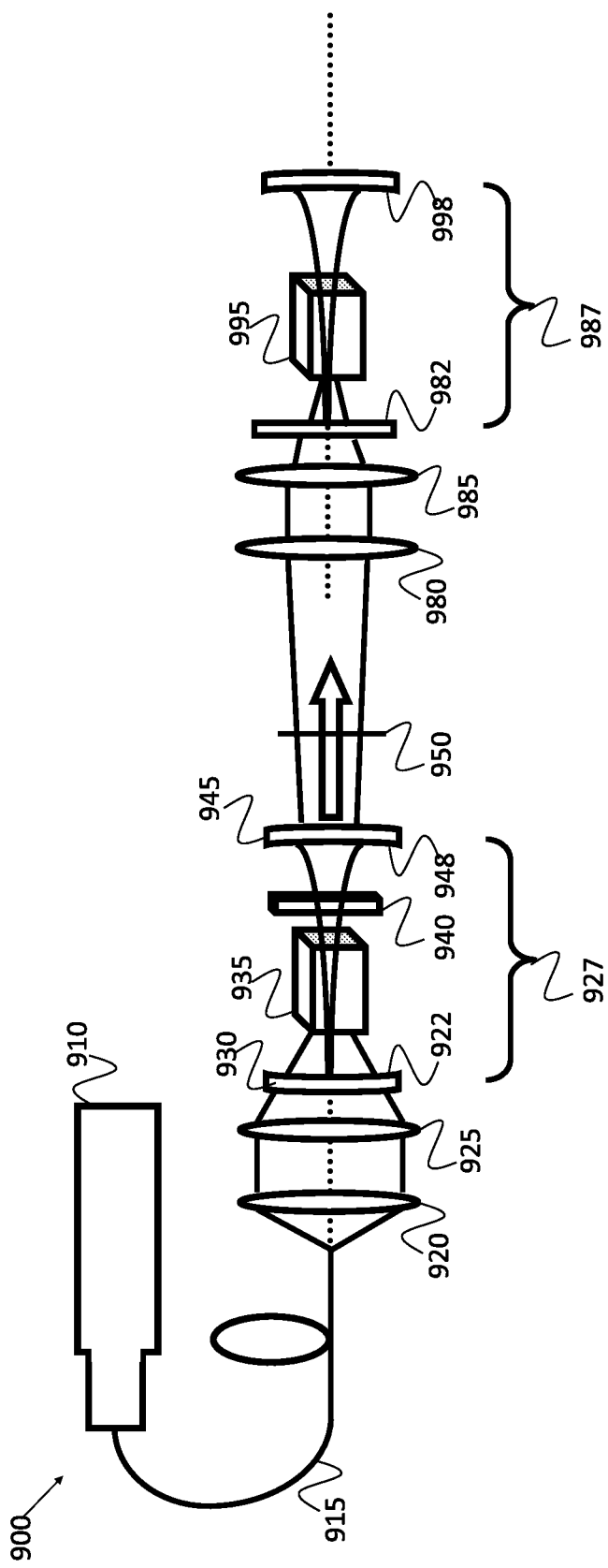

FIG. 9 shows a linear external cavity laser system, according to some exemplary embodiments of the subject matter. The linear external cavity laser system 900 may be a 793 nm pump laser system, which may comprise a laser diode 910.

Laser system 900. Laser diode 910 may be optically coupled into a fiber 915 to generate a gain for a laser.

Laser system 900 may have an optical fiber 915, lenses, e.g. a culminating lens 920, first lens 925, gain medium 935, saturable absorber 940, first surface 922, optical filter 950 all of which may be configured similarly as disclosed in the system of FIG. 1.

The laser system 900 may comprise a first lens and a second lens. Optionally, the laser system comprises an input mirror 930 having an HT coating on the input surface and an HR coating on the output surface. The laser system 900 may comprise a gain medium 935, e.g. a Tm:YLF, Tm:YAP, Tm:YAG crystal. The laser system 900 may comprise an SA of CrZn:S or CrZn:Se as a passive Q-switch. The laser system 900 may comprise an output coupler 945 for the 2 μm cavity 927.

Optionally, the laser system 900 comprises a high-pass filter 950 to block the 793 nm beam. Optionally, the laser system 900 comprises a collimating lens 980 to collimate the 2 μm beam. The laser system 900 may comprise focusing lens 985 to focus the 2 μm beam into Raman gain crystal 995. The laser system 900 may comprise an output coupler 998 for a Raman external cavity 987. Optionally the output coupler 998 may have a 2 μm HR surface coating and a 2.2-2.7 μm PR surface coating.

The Method

In some embodiments, there is provided a method of producing a pulsed laser beam.

Figure 10:
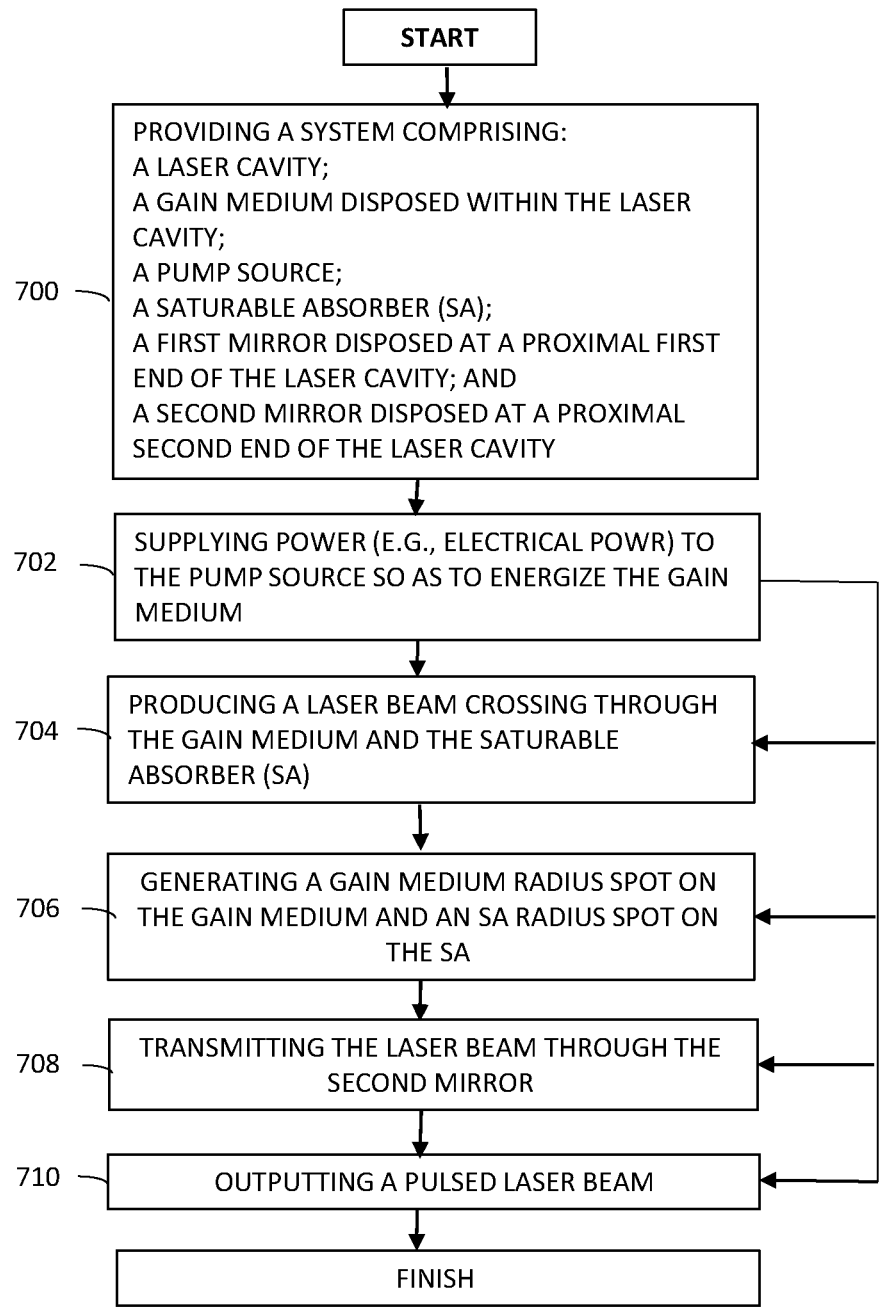
FIG. 10 illustrates a flowchart of a method for producing a pulsed laser beam according to some non-limiting embodiments of the invention.

Reference is now made to FIG. 10, which shows a flowchart of the method for producing a pulsed laser beam according to some embodiments of the present invention.

In some embodiments, the method comprises the steps of: providing the laser system discussed above, which comprises:
a laser cavity;
a gain medium disposed within the laser cavity;
a pump source;
a saturable absorber (SA);
a first mirror disposed at a proximal first end of the laser cavity;
and a second mirror disposed at a proximal second end of the laser cavity (step 700);
supplying power (e.g., electrical power) to the pump source so as to energize the gain medium (step 702).
Upon supplying the power:
a laser beam crossing through the gain medium and the SA may be produced (step 704);
a gain medium radius spot on the gain medium and an SA radius spot on the SA may be generated (step 706);
and thereafter the laser beam may be transmitted through the second mirror (step 708), thereby outputting a pulsed laser beam from the laser cavity (step 710).

In some embodiments, energizing the gain medium causes spontaneous and stimulated energy emission to propagate in the gain medium in a direction transverse to the cavity.

In some embodiments, the pump is delivered through the first mirror e.g., a concave input mirror.

In some embodiments, a ratio of an area of the laser beam within the SA to an area of the laser beam within the gain medium is greater than 1, or in some embodiments, greater than 2, or in some embodiments, greater than 3.5.

In some embodiments, a ratio of the SA radius spot to the gain medium radius spot is within a range of 1.7-7.

In some embodiments, a ratio of the SA radius spot to the gain medium radius spot is within a range of 1.7 to 6. In some embodiments, a ratio of the SA radius spot to the gain medium radius spot is within a range of 1.7 to 5. In some embodiments, a ratio of the SA radius spot to the gain medium radius spot is within a range of 1.7 to 4. In some embodiments, a ratio of the SA radius spot to the gain medium radius spot is within a range of 1.7 to 3.5. In some embodiments, a ratio of the SA radius spot to the gain medium radius spot is within a range of 2 to 4.

In some embodiments, the laser beam is characterized by a wavelength of Infrared (IR) spectrum.

In some embodiments, the pulsed laser beam is characterized by energy of at least 1 mJ. In some embodiments, the pulsed laser beam is characterized by energy of at least 1 mJ. In some embodiments, the pulsed laser beam is characterized by energy of at least 2 mJ. In some embodiments, the pulsed laser beam is characterized by energy of at least 3 mJ. In some embodiments, the pulsed laser beam is characterized by energy of at least 4 mJ. In some embodiments, the pulsed laser beam is characterized by energy of at least 5 mJ.

In some embodiments, the pulsed laser beam energy is in the range of 1 to 10 mJ. In some embodiments, the pulsed laser beam energy is 1, 2, 3, 4, 5, 6, 7, 8, 9, 10 mJ, including any value and range therebetween.

In some embodiments, the electrical power is supplied at 1 to 50 Watts. In some embodiments, the electrical power is supplied at 1 to 40 Watts. In some embodiments, the electrical power is supplied at 1 to 30 Watts. In some embodiments, the electrical power is supplied at 2 to 30 Watts. In some embodiments, the electrical power is supplied at 3 to 30 Watts. In some embodiments, the electrical power is supplied at 1, 5, 10, 15, 20, 25, 30, 35, 40, 45, or 50 Watts, including any value and range therebetween.

In some embodiments, the method further comprises step (iii) of focusing the output laser beam into a Raman gain crystal.

In some embodiments, step (iii) is performed by positioning focusing lens between the output laser beam and the Raman gain crystal such that the focusing lens contacts the output laser beam, for forming the focused laser beam.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

GENERAL

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

In the description and claims of the application, each of the words "comprise" "include" and "have", and forms thereof, are not necessarily limited to members in a list with which the words may be associated. In addition, where there are inconsistencies between this application and any document incorporated by reference, it is hereby intended that the present application controls.

What is claimed is:

1. A laser system, comprising:
a lasercavity;
a gain medium disposed within the laser cavity;
a pump configured to optically pump the lasing medium;
a saturable absorber (SA);
a first mirror disposed at a proximal first end of the laser cavity; and
a second mirror disposed at a proximal second end of the laser cavity;
wherein:
the first mirror, the second mirror, and the saturable absorber are disposed along a horizontal axis with the laser cavity;
the saturable-absorber is disposed between the second mirror and the laser cavity, the system is configured to provide a laser beam along a horizontal axis, such that a ratio of an area of the beam area within the saturable-absorber to an area of the laser beam within the gain medium to is greater than 1;
the beam generates a gain medium radius spot on the gain medium and a saturable absorber radius spot on the saturable absorber, and
a ratio between a saturable absorber radius spot on the saturable absorber and the gain medium radius spot on the gain medium is within a range of 1.7-7.

2. The laser system of claim 1, wherein the laser beam is characterized by a wavelength of Infrared (IR) spectrum.

3. The laser system of claim 1, wherein the laser beam is characterized by wavelength in the range from 1800 to 2650 nm.

4. The laser system of claim 1, wherein the laser beam is characterized by wavelength in the range from 1800 to 2100 nm.

5. The laser system of claim 1, wherein the ratio of the area of the beam area within the saturable-absorber to the area of the laser beam within the lazing medium is greater than 3.5.

6. The laser system of claim 1, wherein the SA comprises a material selected from the group consisting of silver halides and chalcogenides.

7. The laser system of claim 1, wherein the lasing medium comprises a material substantially doped with a rare earth element.

8. The laser system of claim 1, wherein the gain medium comprises a crystal selected from the group consisting of Yttrium Aluminum Garnet (YAG), Yttrium Aluminum Phosphorus (YAP), and Yttrium Lithium Fluoride (YLF).

9. The laser system of claim 1, wherein the rare earth element is selected from the group consisting of Thulium (Tm), Holmium (Ho), Erbium (Er), or any combination thereof.

10. A passive Q-switch diode-pumped laser system, comprising:
a gain medium; and
a saturable absorber;
wherein the gain medium and the saturable absorber are disposed along a horizontal axis,
wherein the system is configured to provide a laser beam along the horizontal axis, such that a ratio of an area of the beam area within the saturable-absorber to an area of the laser beam within the gain medium is greater than 1,
wherein the beam generates a gain medium radius spot on the gain medium and a saturable absorber radius spot on the saturable absorber, and
wherein a ratio between a saturable adsorber radius spot on the saturable absorber and the gain medium radius spot on the gain medium and a saturable absorber radius spot on the saturable absorber is within a range of 1.7-7.

11. A method for producing a pulsed laser beam, the method comprising:
(i) providing a system comprising:
a laser cavity;
a gain medium disposed within the laser cavity;
a pump source;
a saturable absorber (SA);
a first mirror disposed at a proximal first end of the laser cavity; and
a second mirror disposed at a proximal second end of the laser cavity;
(ii) supplying electrical power to the pump source so as to energize the gain medium, thereby:
producing a laser beam crossing through the gain medium and the SA; generating a gain medium radius spot on the gain medium;

generating an SA radius spot on the SA;
transmitting the laser beam through the second mirror, thereby outputting a pulsed laser beam;
wherein:
(a) a ratio of an area of the laser beam within the SA to an area of the laser beam within the gain medium is greater than 1, and
(b) a ratio of the gain medium radius spot to the SA radius spot to the gain medium radius spot is within a range of 1.7-7.

12. The method of claim 11, wherein the ratio of an area of the laser beam within the SA to an area of the laser beam within the gain medium is greater than 3.5.

13. The method of claim 11, wherein the output laser beam is characterized by a wavelength of Infrared (IR) spectrum.

14. The method of claim 11, wherein the output laser beam is characterized by energy of at least 1 mJ.

15. The method of claim 14, wherein said energy is in the range of 1 to 10 mJ.

16. The method of claim 11, wherein the electrical power is supplied at 1 to 50 Watts.

17. The method of claim 11, further comprising a step (iii) of focusing the output laser beam into a Raman gain crystal.

\* \* \* \* \*